(12) United States Patent
Watanabe et al.

(10) Patent No.: US 12,523,606 B2
(45) Date of Patent: Jan. 13, 2026

(54) METHOD FOR DETECTING TARGET SUBSTANCE, FLUID DEVICE, AND KIT

(71) Applicant: Riken, Wako (JP)

(72) Inventors: Rikiya Watanabe, Wako (JP); Asami Makino, Wako (JP); Hajime Shinoda, Wako (JP)

(73) Assignee: Riken, Wako (JP)

( * ) Notice: Subject to any disclaimer, the term of this patent is extended or adjusted under 35 U.S.C. 154(b) by 540 days.

(21) Appl. No.: 18/029,567

(22) PCT Filed: Oct. 5, 2021

(86) PCT No.: PCT/JP2021/036802
§ 371 (c)(1),
(2) Date: Apr. 26, 2023

(87) PCT Pub. No.: WO2022/075313
PCT Pub. Date: Apr. 14, 2022

(65) Prior Publication Data
US 2023/0366820 A1    Nov. 16, 2023

(30) Foreign Application Priority Data

Oct. 6, 2020    (JP) .................................. 2020-169092

(51) Int. Cl.
*B01L 7/00*    (2006.01)
*B01D 15/08*    (2006.01)
(Continued)

(52) U.S. Cl.
CPC ..... *G01N 21/6452* (2013.01); *G01N 21/6428* (2013.01)

(58) Field of Classification Search
CPC ........... G01N 21/6452; G01N 21/6428; G01N 2021/6482; C12Q 1/00
See application file for complete search history.

(56) References Cited

U.S. PATENT DOCUMENTS

2007/0264705 A1*  11/2007  Dodgson .......... B01L 3/502761
                                                                 435/283.1
2008/0038845 A1    2/2008  Ehwald et al.
(Continued)

FOREIGN PATENT DOCUMENTS

CN    102239245 A    11/2011
CN    107109467 A     8/2017
(Continued)

OTHER PUBLICATIONS

Um, Eujin, et al. "Mesh-integrated microdroplet array for simultaneous merging and storage of single-cell droplets." Lab on a Chip 12.9 (2012): 1594-1597. (Year: 2012).*
(Continued)

*Primary Examiner* — Jennifer Wecker
*Assistant Examiner* — Oyeleye Alexander Alabi
(74) *Attorney, Agent, or Firm* — Blank Rome LLP

(57) ABSTRACT

A method for detecting a target substance in a sample includes a step of introducing the sample and a reagent that generates a fluorescent substance in a presence of the target substance into each well of a well array; a step of sealing each well of the well array with a sealing liquid such that each well forms an independent reaction space; a step of replacing the sealing liquid with a water-absorbing organic solvent, thereby dehydrating the content of the well, reducing the volume, and generating the fluorescent substance in a case where the target substance is present in the content; and a step of emitting excitation light to the fluorescent substance to detect fluorescent light generated in each well of the well array, in which detection of the fluorescent light in the well indicates the presence of the target substance in the well.

9 Claims, 13 Drawing Sheets
Specification includes a Sequence Listing.

(51) Int. Cl.
*B01F 33/302* (2022.01)
*B01F 33/3033* (2022.01)
*B01L 3/00* (2006.01)
*B01L 9/00* (2006.01)
*B65G 47/80* (2006.01)
*B82Y 20/00* (2011.01)
*B82Y 30/00* (2011.01)
*B82Y 40/00* (2011.01)
*C12M 1/34* (2006.01)
*C12M 3/06* (2006.01)
*C12N 1/14* (2006.01)
*C12N 1/20* (2006.01)
*C12Q 1/02* (2006.01)
*C12Q 1/6806* (2018.01)
*C12Q 1/6844* (2018.01)
*C12Q 1/6848* (2018.01)
*C12Q 1/686* (2018.01)
*G01N 15/10* (2024.01)
*G01N 15/14* (2024.01)
*G01N 15/1433* (2024.01)
*G01N 21/29* (2006.01)
*G01N 21/64* (2006.01)
*G01N 21/65* (2006.01)
*G01N 30/02* (2006.01)
*G01N 30/72* (2006.01)
*G01N 33/543* (2006.01)
*G01N 33/557* (2006.01)
*G01N 33/574* (2006.01)
*G01N 33/58* (2006.01)

(56) References Cited

U.S. PATENT DOCUMENTS

| | | | |
|---|---|---|---|
| 2015/0211048 A1 | 7/2015 | Ramsey et al. | |
| 2018/0196059 A1 | 7/2018 | Makino | |
| 2020/0270674 A1 | 8/2020 | Hirase et al. | |

FOREIGN PATENT DOCUMENTS

| | | | |
|---|---|---|---|
| CN | 109358043 A | 2/2019 | |
| CN | 109477133 A | 3/2019 | |
| EP | 3 415 607 A1 | 12/2018 | |
| JP | S56-49960 A | 5/1981 | |
| JP | 2004-309405 A | 11/2004 | |
| JP | 2007-050351 A | 3/2007 | |
| JP | 2012-529643 A | 11/2012 | |
| JP | 2019-66480 A | 4/2019 | |
| WO | 2005/023124 A2 | 3/2005 | |
| WO | 2010/142954 A1 | 12/2010 | |
| WO | 2017/043530 A1 | 3/2017 | |
| WO | 2018/003856 A1 | 1/2018 | |
| WO | WO 2019/131592 A1 | 7/2019 | |
| WO | WO 2019/131673 A1 | 7/2019 | |

OTHER PUBLICATIONS

A.P. Soleimany et al., "Activity-Based Diagnostics: An Emerging Paradigm for Disease Detection and Monitoring." Trends in Molecular Medicine, vol. 26, No. 5, pp. 450-468, 2020.

International Search Report for International Application No. PCT/JP2021/036802, mailed Nov. 9, 2021.

Extended European Search Report dated Oct. 8, 2024 issued in EP Application No. 21877612.8.

Eujin Um et al., "Mesh-integrated microdroplet array for simultaneous merging and storage of single-cell droplets", Lab on a Chip, vol. 12, No. 9, Jan. 1, 2012 (Jan. 1, 2012), p. 1594, XP055097129, ISSN: 1473-0197, DOI: 10.1039/c2lc21266h, pp. 1594-1597, Figs. 1-2.

Eujin Um et al., "Mesh-integrated microdroplet array for simultaneous merging and storage of single-cell droplets", Lab on a Chip, vol. 12, No. 9, Jan. 1, 2012 (Jan. 1, 2012), p. 1594, XP093207076, UK, ISSN: 1473-0197, DOI: 10.1039/c2lc21266h, pp. 2, 4 and Figs. S2 and S4.

Shang Ming-Mei, Liu Xiu-Wen, Tang Zhong-Ming, Chen Hui-Peng, Sun Xiao, Ou Lun, Song Hai-Feng, Preliminary research on fluorescent probe method for quantitation of phosphorothioate oligonucleotide PS20 in plasma, Chin J Pharmacol Tocicol, No. 6, Dec. 25, 2005.

Search Report issued in CN Application No. 202180080274.4 dated Aug. 18, 2025 (Translation).

Office Action and the Search Report in CN Application No. 202180080274.4 dated Aug. 18, 2025 with translation of Search Report.

\* cited by examiner

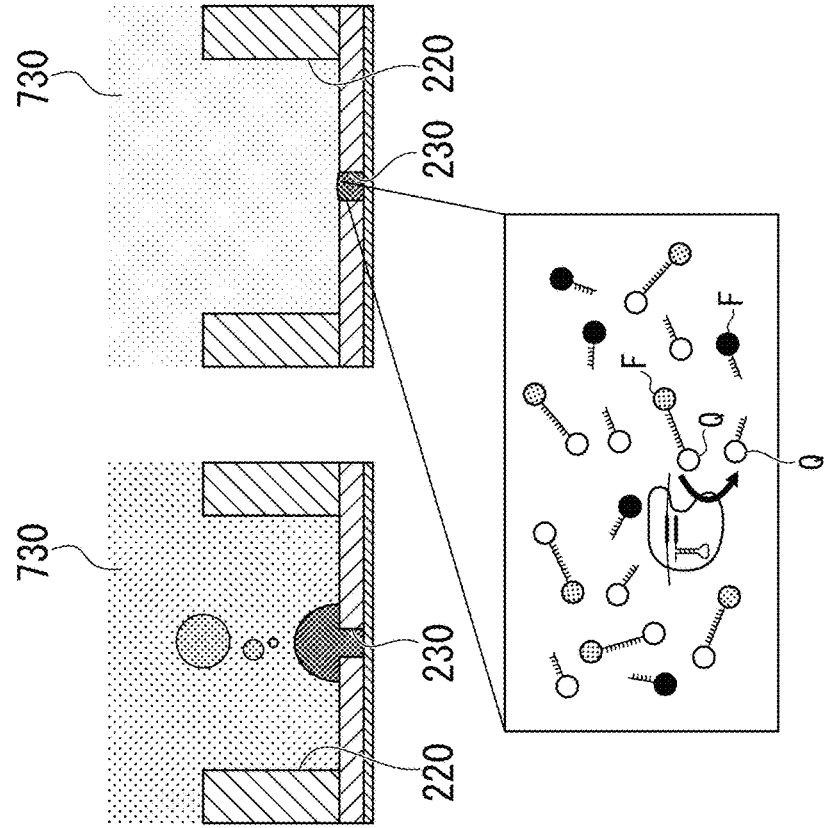
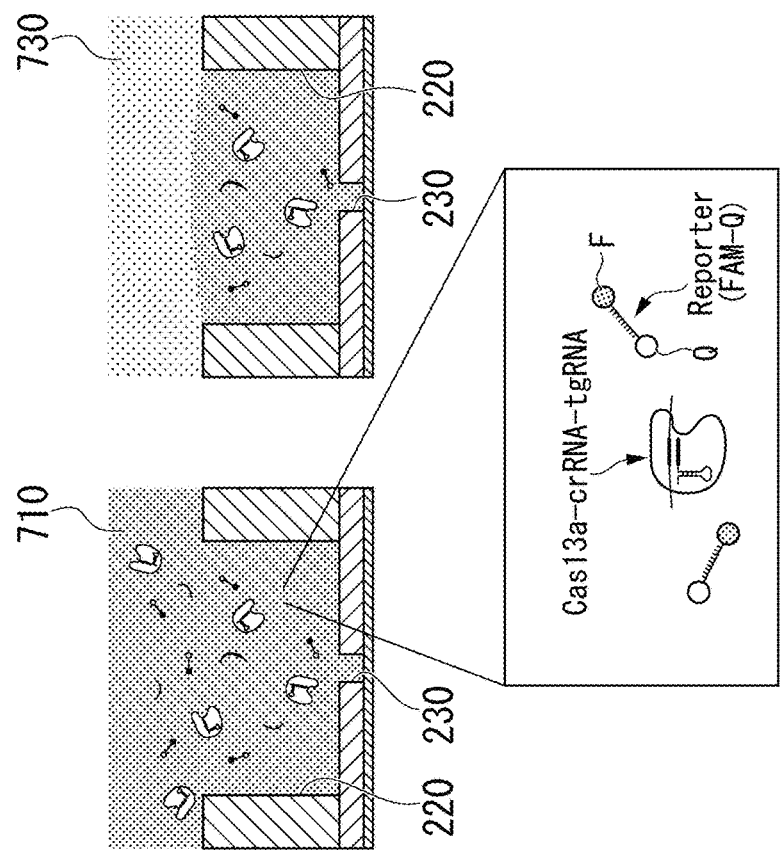

METHOD FOR DETECTING TARGET SUBSTANCE, FLUID DEVICE, AND KIT

TECHNICAL FIELD

The present invention relates to a method for detecting a target substance, a fluid device, and a kit. Priority is claimed on Japanese Patent Application No. 2020-169092 filed Oct. 6, 2020 in Japan, the content of which is incorporated herein by reference.

BACKGROUND ART

In recent years, performing detection or monitoring of diseases has been examined based on enzymatic activity. Such a diagnostic method is called Activity-Based Diagnostics (ABDx) (for example, refer to Non-Patent Document 1).

Diseases targeted for diagnosis by ABDx include infectious diseases such as viral infections, non-infectious diseases such as cancer, and the like. For example, viral infection can be detected by detecting a virus-derived nucleic acid as a marker. In addition, cancer can be detected by detecting the activity of an enzyme such as cathepsin that is unable to be controlled in a cancer tissue as a disease marker.

In addition, it is known that blood contains free DNA (cell-free DNA, cfDNA) released from cells due to cell death. Blood tumor DNA (circulating tumor DNA, ctDNA), which is DNA derived from cancer cells, is also contained in the cfDNA of cancer patients.

In addition, it is known that various cells secrete membrane vesicles called exosomes, and exosomes are included in biological samples such as saliva, blood, urine, amniotic fluid, and malignant ascites, or in a supernatant of cultured cells. Exosomes contain various proteins, lipids, microRNA, DNA, and the like, derived from cells that secrete thereof.

In recent years, there has been conducted research in which cfDNA, microRNA (miRNA) in membrane vesicles such as exosomes, DNA, or the like is applied to early detection of cancer or various other diseases, prediction of an effect of anticancer drugs, diagnosis of predisposition to diseases, diagnosis of genetic diseases, and the like.

As described above, there is a demand for a technology for highly sensitive detection of virus-derived nucleic acids, enzymes, cfDNA, ctDNA, miRNA, and the like as target substances.

By the way, Patent Document 1 discloses detection of enzymatic activity at a single-molecule level using a microchamber of a femtoliter order size.

Citation List

Patent Document 1: Japanese Unexamined Patent Application, Publication No. 2004-309405

Non-Patent Document 1: Soleimany A. P. and Bhatia S. N., Activity-Based Diagnostics: An Emerging Paradigm for Disease Detection and Monitoring, Trends Mol Med, 26 (5), 450-468, 2020.

SUMMARY OF THE INVENTION

Technical Problem

By miniaturizing the volume of a reaction space where an enzymatic reaction is performed, as in the microchamber disclosed in Patent Document 1, a detection time of the enzymatic reaction can be shortened. However, in a case where the volume of the reaction space is miniaturized, there is a case where a proportion of the target substance captured in the reaction space decreases, and detection sensitivity is lowered. Accordingly, an object of the present invention is to provide a technology capable of detecting a target substance with high sensitivity.

Solution to Problem

The present invention includes the following aspects.

[1] A method for detecting a target substance in a sample, including:
a step of introducing the sample and a reagent that generates a fluorescent substance in a presence of the target substance into each well of a well array;
a step of sealing each well of the well array with a sealing liquid such that each well forms an independent reaction space;
a step of replacing the sealing liquid with a water-absorbing organic solvent, thereby dehydrating the content of the well, reducing the volume, and generating the fluorescent substance in a case where the target substance is present in the content; and
a step of emitting excitation light to the fluorescent substance to detect fluorescent light in each well of the well array,
in which detection of the fluorescent light in the well indicates the presence of the target substance in the well.

[2] The method according to [1],
in which each well of the well array has a first well and a second well arranged at a bottom of the first well and having a smaller volume than the first well, and in a case where the volume of the content of the first well becomes small, the content is accumulated in the second well.

[3] The method according to [2],
in which the ratio of the volumes of the first well and the second well (volume of first well: volume of second well) is 10:1 to 1,000,000:1.

[4] The method according to [2] or [3],
in which the volume of the first well is 1 to 1,000 pL and the volume of the second well is 0.1 to 1,000 fL.

[5] The method according to any one of [2] to [4],
in which 0 or 1 of the target substance is introduced into each of the first wells.

[6] The method according to any one of [1] to [5],
in which the sealing liquid is a fluorine-based liquid, a mineral oil, or a linear or branched, saturated or unsaturated hydrocarbon having 7 to 17 carbon atoms.

[7] The method according to any one of [1] to [6],
in which the water-absorbing organic solvent is a linear or branched, saturated or unsaturated aliphatic alcohol having 4 to 11 carbon atoms.

[8] A fluid device including:
a substrate having a surface on which a well array including a plurality of wells having a first well and a second well arranged at a bottom of the first well and having a smaller volume than the first well is arranged;
a lid member arranged to face the well array; and
a spacer for separating the substrate and the lid member,
in which a space between the well array and the lid member forms a flow path through which fluid flows.

[9] A target substance detection kit including:
the fluid device according to [8];
a reagent that generates a fluorescent substance in a presence of the target substance;
a sealing liquid; and
a water-absorbing organic solvent.

Advantageous Effects of Invention

According to the present invention, it is possible to provide a technology capable of detecting a target substance with high sensitivity.

BRIEF DESCRIPTION OF THE DRAWINGS

FIG. 7A is a schematic cross-sectional view showing an example of procedures for carrying out a method for detecting a target substance using a fluid device.
FIG. 7B is a schematic cross-sectional view showing an example of procedures for carrying out a method for detecting a target substance using a fluid device.
FIG. 7C is a schematic cross-sectional view showing an example of procedures for carrying out a method for detecting a target substance using a fluid device.
FIG. 7D is a schematic cross-sectional view showing an example of procedures for carrying out a method for detecting a target substance using a fluid device.

DESCRIPTION OF EMBODIMENTS

Figure 1A:
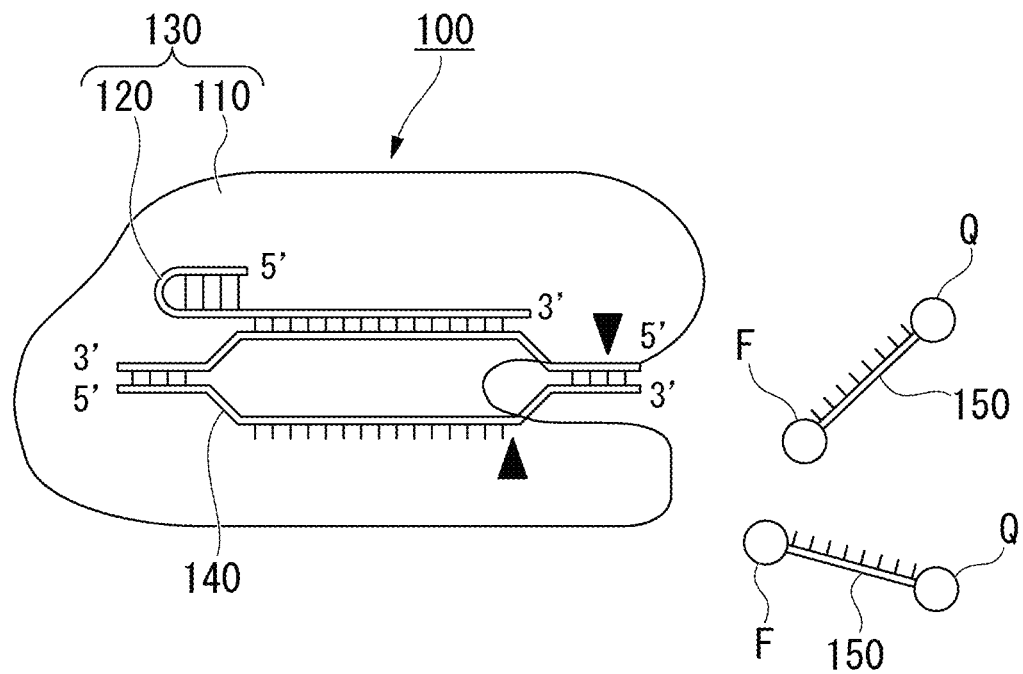
FIG. 1A is a schematic diagram showing an example of a method for detecting a target substance.

Hereinafter, embodiments of the present invention will be described in detail with reference to the drawings as the case may be. In the drawings, the same or corresponding parts are denoted by the same or corresponding reference numerals, and overlapping descriptions are omitted. Note that dimensional ratios in each drawing are exaggerated for the sake of explanation, and do not necessarily match the actual dimensional ratios.

Method for Detecting Target Substance

In one embodiment, the present invention provides a method for detecting a target substance in a sample, the method including: a step of introducing the sample and a reagent that generates a fluorescent substance in a presence of the target substance into each well of a well array;
a step of sealing each well of the well array with a sealing liquid such that each well forms an independent reaction space;
a step of replacing the sealing liquid with a water-absorbing organic solvent, thereby dehydrating the content of the wells, reducing the volume, and generating the fluorescent substance in a case where the target substance is present in the content; and
a step of emitting excitation light to the fluorescent substance to detect fluorescent light generated in each well of the well array,
in which detection of fluorescent light in the well indicates the presence of the target substance in the well.

As will be described later in Examples, according to a method for the present embodiment, a target substance can be detected with high sensitivity.

(Sample)

The sample is not particularly limited, and examples thereof include biological samples such as saliva, blood, urine, amniotic fluid, malignant ascites, pharyngeal swab, and nasal swab, supernatant of cultured cells, and the like.

Target Substance

The target substance is not particularly limited, and includes enzymes, single-stranded nucleic acid fragments, double-stranded nucleic acid fragments, and the like. A nucleic acid fragment may be a virus-derived nucleic acid, cfDNA, ctDNA, miRNA, and the like. As the enzyme, any enzyme can be targeted, and examples thereof include coronavirus main protease, alkaline phosphatase, protease derived from a living organism, and the like. Examples of the protease derived from a living organism include serine protease, cysteine protease, cathepsin, and the like.

Reagent that Generates a Fluorescent Substance in Case where Target Substance is Present Examples of a reagent (detection reagent) that generates a fluorescent substance in a presence of a target substance include a fluorescent substrate corresponding to a targeted enzyme in a case where the target substance is an enzyme. Such a fluorescent substrate is one that generates a fluorescent substance by an enzymatic reaction.

More specifically, in a case where the enzyme is a peptidase, a peptide substrate labeled with a fluorescent substance and a quencher and the like are exemplary examples. Fluorescent light is detected in a case where such a peptide substrate is cleaved by a peptidase. In addition, in a case where the enzyme is a phosphatase, a fluorescent substance quenched by adding a phosphate group and the like are exemplary examples. Fluorescent light is detected in a case where the phosphate group is removed from such a substance.

In addition, among CRISPR/Cas family proteins that have been applied to genome editing in recent years, Cas12 and Cas13 form a three-part complex with a gRNA and a target nucleic acid, and in a case where the target nucleic acid is cleaved, express activity of cleaving the surrounding DNA or RNA.

By utilizing this reaction, a fluorescent substance can be generated using a single-stranded nucleic acid fragment or a double-stranded nucleic acid fragment as a target substance (target nucleic acid). Specifically, a double-stranded DNA fragment can be detected as a target substance by using the Cas12 protein. In addition, by using the Cas13 protein, a single-stranded RNA fragment or a single-stranded DNA fragment can be detected as a target substance.

Figure 1B:
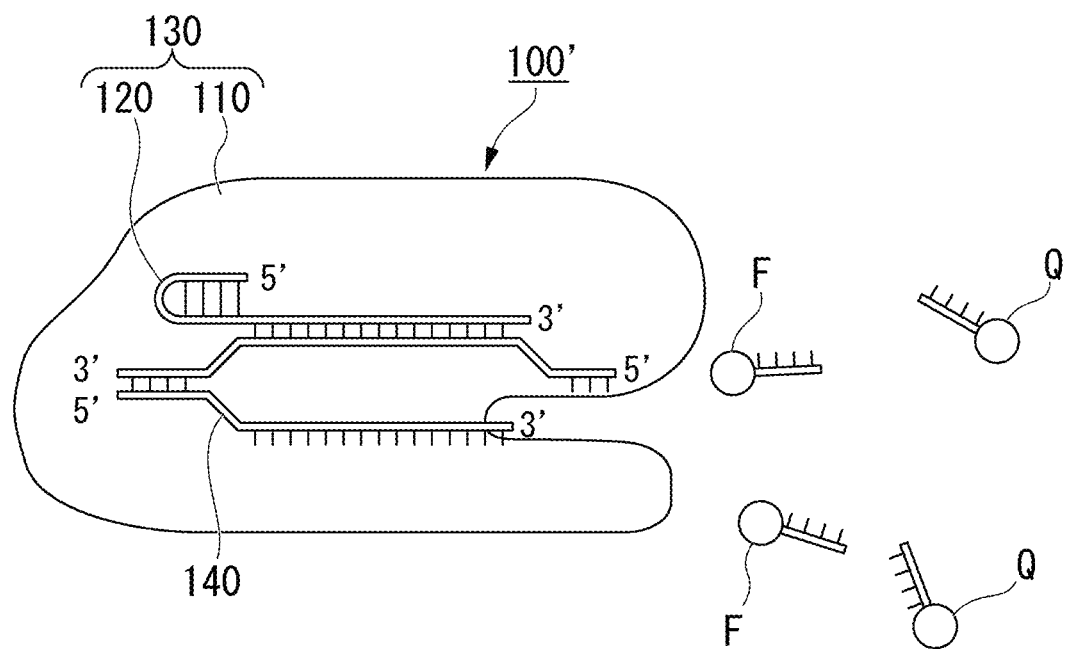
FIG. 1B is a schematic diagram showing an example of a method for detecting a target substance.

FIGS. 1A and 1B are schematic diagrams showing this reaction. FIGS. 1A and 1B show an example in which the CRISPR/Cas family protein is a Cas12a protein.

First, as shown in FIG. 1A, in a case where a Cas12a protein 110 and a gRNA 120 are brought into contact with each other, these bind to each other to form a two-part complex 130. The gRNA 120 partially has a base sequence complementary to a target nucleic acid fragment 140 (target substance).

Subsequently, in a case where the target nucleic acid fragment 140 in a sample is brought into contact with the two-part complex 130, the Cas12a protein 110, the gRNA 120, and the target nucleic acid fragment 140 form a three-part complex 100. At this stage, since the Cas12a protein 110 does not express nuclease activity, a substrate nucleic acid fragment 150 is not cleaved. In the examples of FIGS. 1A and 1B, the substrate nucleic acid fragment 150 is a single-stranded DNA fragment labeled with a fluorescent substance F and a quencher Q. Even if excitation light is emitted to the substrate nucleic acid fragment 150, fluorescent light is not generated.

In a case where the three-part complex 100 is formed, the Cas12a protein 110 cleaves a target site of the target nucleic acid fragment 140. In FIG. 1A, the target site of the target nucleic acid fragment 140 is indicated by an arrowhead. FIG. 1B is a schematic diagram showing a three-part complex 100' in which the target site of the target nucleic acid fragment 140 is cleaved. As shown in FIG. 1B, the three-part complex 100' expresses nuclease activity. Then, a substrate nucleic acid fragment 150 existing around the three-part complex 100' is cleaved. As a result, a fluorescent substance F of the substrate nucleic acid fragment 150 is separated from a quencher Q. In a case where excitation light is emitted to the fluorescent substance F separated from the quencher Q, fluorescent light can be detected. In a case where fluorescent light is detected, it can be determined that the target nucleic acid fragment 140 was present in the sample.

In this case, a reagent that generates a fluorescent substance in a presence of a target substance can be said to be the CRISPR/Cas family protein 110, the gRNA 120, and the substrate nucleic acid fragment 150.

The sample, the CRISPR/Cas family protein 110, the gRNA 120, and the substrate nucleic acid fragment 150 may be mixed and brought into contact with one another in any order.

For example, first, the CRISPR/Cas family protein 110 and the gRNA 120 may be brought into contact with each other to form a two-part complex 130 in advance, and then the sample may be brought into contact therewith. In this case, in a case where the target nucleic acid fragment 140 is present in the sample, the target nucleic acid fragment 140 binds to the two-part complex 130 to form the three-part complex 100. After that, the substrate nucleic acid fragment 150 may be brought into contact.

Alternatively, after forming the two-part complex 130, the target nucleic acid fragment 140 and the substrate nucleic acid fragment 150 may be brought into contact simultaneously.

Alternatively, the CRISPR/Cas family protein 110, the gRNA 120, and the sample may be brought into contact simultaneously. Also in this case, in a case where the target nucleic acid fragment 140 is present in the sample, the three-part complex 100 is finally formed. After that, the substrate nucleic acid fragment 150 may be brought into contact.

Alternatively, the sample, CRISPR/Cas family protein 110, the gRNA 120, and the substrate nucleic acid fragment 150 may be brought into contact therewith simultaneously. Even in this case, in a case where the target nucleic acid fragment 140 is present in the sample, the three-part complex 100 is finally formed, and in the three-part complex 100, in a case where the target site of the target nucleic acid fragment 140 is cleaved, the three-part complex 100 is converted into the three-part complex 100', and expresses nuclease activity, and the substrate nucleic acid fragment 150 is cleaved.

gRNA

In the method of the present embodiment, a guide RNA (gRNA) is not particularly limited as long as the guide RNA can be used for the CRISPR/Cas family protein, the guide RNA may be a complex of CRISPR RNA (crRNA) and transactivating CRISPR RNA (tracrRNA), may be a single gRNA (sgRNA) obtained by combining tracrRNA and crRNA, or may be crRNA alone.

In a case where the used CRISPR/Cas family protein is a Cas12a protein, the crRNA can be, for example, the following base sequence. First, a base sequence obtained by removing a protospacer adjacent motif (PAM) sequence from a target base sequence is defined as a spacer base sequence. Subsequently, a base sequence obtained by linking a scaffold sequence to a 3' end of the spacer base sequence is provided, and a complementary strand thereof is used as the base sequence of crRNA.

For example, in a case where the base sequence obtained by removing the PAM sequence from the target base sequence is "5'-GCCAAGCGCACCTAATTTCC-3'" (SEQ ID NO: 1), the base sequence of crRNA for Cas12a protein can be "5'-AAUUUCUACUAAGUGUAGAUG-GAAAUUAGGUGCGCUUGGC-3'" (SEQ ID NO: 2).

In a case where the used CRISPR/Cas family protein is a Cas13a protein, the crRNA can be, for example, the following base sequence. First, a base sequence obtained by linking a scaffold sequence to a 3' end of the complementary base sequence to the target base sequence is provided, and the complementary strand thereof is used as the base sequence of crRNA.

For example, in a case where the target base sequence is "5'-AUGGAUUACUUGGUAGAACAGCAAUCUA-3'" (SEQ ID NO: 3), the base sequence of crRNA for Cas13a protein can be "5'-GAUUUAGACUACCC-CAAAAACGAAGGGGACUAAAACUAGAUUGCU-GUUCUAA CCAAGUAAUCCAU-3'" (SEQ ID NO: 4).

CRISPR/Cas Family Protein

As the CRISPR/Cas family protein, any CRISPR/Cas family protein can be used as long as the CRISPR/Cas family protein can express nuclease activity after forming a three-part complex with a gRNA and a target nucleic acid fragment. As described above, more precisely, nuclease activity is expressed after a three-part complex is formed and the CRISPR/Cas family protein cleaves the target nucleic acid fragment.

Examples of such a CRISPR/Cas family protein include the Cas12 protein, the Cas13 protein, and the like. In the present specification, the Cas12 protein and Cas13 protein may be a Cas12 protein, a Cas13 protein, orthologs of these proteins, variants of these proteins, and the like.

More specific examples of the CRISPR/Cas family proteins that can be used in the method for the present embodiment include, for example, Lachnospiraceae bacterium ND2006-derived Cas12a protein (LbCas12a, UniProtKB Accession Number: A0A182DWE3), *Acidaminococcus* sp.-derived Cas12a protein (AsCas12a, UniProtKB Accession Number: U2UMQ6), *Francisella tularensis* subsp. novicida-derived Cas12a protein (FnCas12a, UniProtKB Accession Number: A0Q7Q2), *Alicyclobacillus acidoterrestris*-derived Cas12b protein (AaCas12b, UniProtKB Accession Number: T0D7A2), *Leptotrichia wadei*-derived Cas13a protein (LwaCas13a, NCBI Accession Number: WP_021746774.1), *Lachnospiraceae bacterium* NK4A179-derived Cas13a protein (LbaCas13a, NCBI Accession Number: WP_022785443.1), *Leptotrichia buccalis* C-1013-b-derived Cas13a protein (LbuCas13a, NCBI Accession Number: WP_015770004.1), *Bergeyella zoohelcum*-derived Cas13b protein (BzoCas13b, NCBI Accession Number: WP_002664492), *Prevotella intermedia*-derived Cas13b protein (PinCas13b, NCBI Accession Number: WP_036860899), *Prevotella buccae*-derived Cas13b protein (PbuCas13b, NCBI Accession Number: W_004343973), *Alistipes* sp. ZOR0009-derived Cas13b protein (AspCas13b, NCBI Accession Number: WP_047447901), *Prevotella* sp. MA2016-derived Cas13b protein (PsmCas13b, NCBI Accession Number: WP_036929175), *Riemerella anatipestifer*-derived Cas13b protein (RanCas13b, NCBI Accession Number: WP_004919755), *Prevotella aurantiaca*-derived Cas13b protein (PauCas13b, NCBI Accession Number: WP_025000926), *Prevotella saccharolytica*-derived Cas13b protein (PsaCas13b, NCBI Accession Number: WP_051522484), *Prevotella intermedia*-derived Cas13b protein (Pin2Cas13b, NCBI Accession Number: WP_061868553), *Capnocytophaga canimorsus*-derived Cas13b protein (CcaCas13b, NCBI Accession Number: WP_013997271), *Porphyromonas gulae*-derived Cas13b protein (PguCas13b, NCBI Accession Number: WP_039434803), *Prevotella* sp. P5-125-derived Cas13b protein (PspCas13b, NCBI Accession Number: WP_044065294), *Porphyromonas gingivalis*-derived Cas13b protein (PigCas13b, NCBI Accession Number: WP_053444417), *Prevotella intermedia*-derived Cas13b protein (Pin3Cas13b, NCBI Accession Number: WP_050955369), *Enterococcus italicus*-derived Csm6 protein (EiCsm6, NCBI Accession Number: WP_007208953.1), *Lactobacillus salivarius*-derived Csm6 protein (LsCsm6, NCBI Accession Number: WP_081509150.1), *Thermus thermophilus*-derived Csm6 protein (TtCsm6, NCBI Accession Number: WP_011229148.1), and the like.

In the method for the present embodiment, the CRISPR/Cas family protein may be a mutant of the above-described Cas family protein. As a mutant, for example, a mutant with increased nuclease activity after forming a three-part complex and the like can be used.

Substrate Nucleic Acid Fragment

The substrate nucleic acid fragment is labeled with a fluorescent substance and a quencher, and in a case where the fluorescent substance cleaved by the nuclease activity of the three-part complex is separated from the quencher, fluorescent light is emitted by emission of excitation light.

The substrate nucleic acid fragment may be appropriately selected according to substrate specificity of the used CRISPR/Cas family protein. For example, the Cas12 protein cleaves a single-stranded DNA as a substrate. Therefore, in a case of using the Cas12 protein, it is preferable to use a single-stranded DNA as the substrate nucleic acid fragment. In addition, the Cas13 protein cleaves a single-stranded RNA as a substrate. Therefore, in a case of using the Cas13 protein, it is preferable to use a single-stranded RNA as the substrate nucleic acid fragment.

As for combination of the fluorescent substance and the quencher, a combination that can quench the fluorescent light of the fluorescent substance in a case of being brought close to each other is used. For example, in a case of using FAM, HEX, and the like as the fluorescent substance, Iowa Black FQ (IDT), TAMRA, or the like can be used as the quencher.

Well Array

In the method for the present embodiment, each well of the well array has a first well and a second well arranged at a bottom of the first well and having a smaller volume than the first well, and in a case where the volume of the content of the first well becomes small, the content may be accumulated in the second well.

Figure 2A:
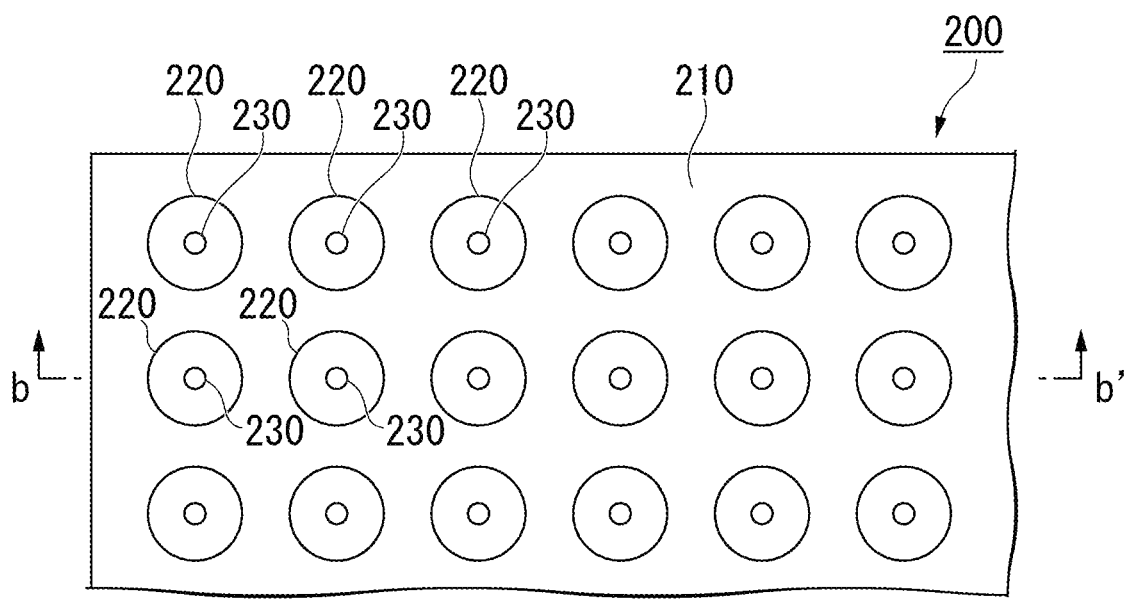
FIG. 2A is a schematic diagram showing an example of a well array having a first well and a second well.
Figure 2B:
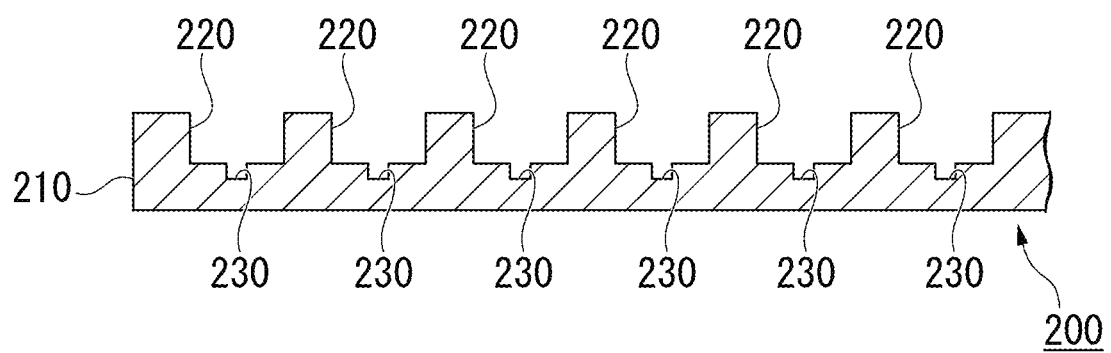
FIG. 2B is a cross-sectional view taken along line b-b' in an arrow direction of FIG. 2A.

FIGS. 2A and 2B are schematic diagrams showing an example of a well array having a first well and a second well. FIG. 2A is a top view, and FIG. 2B is a cross-sectional view taken along line b-b' of FIG. 2A.

As shown in FIGS. 2A and 2B, a well array 200 is formed on one side of a substrate 210. Each well of the well array 200 has a first well 220 and a second well 230 arranged at a bottom of the well 220 and having a smaller volume than the well 220. As will be described below, in a case where the volume of the content of the first well 220 becomes small, the content is accumulated in the second well 230.

That is, by capturing a target substance in the large-volume well 220 and performing detection in the small-volume well 230, the target substance can be detected with high sensitivity and the time required for detection can be also shortened.

The ratio of the volume of the first well 220 to the second well 230 (volume of well 220: volume of well 230) may be 10:1 to 1,000,000:1.

Alternatively, the volume of the first well 220 may be 1 to 1,000 pL and the volume of the second well 230 may be 0.1 to 1,000 fL.

Figure 3A:
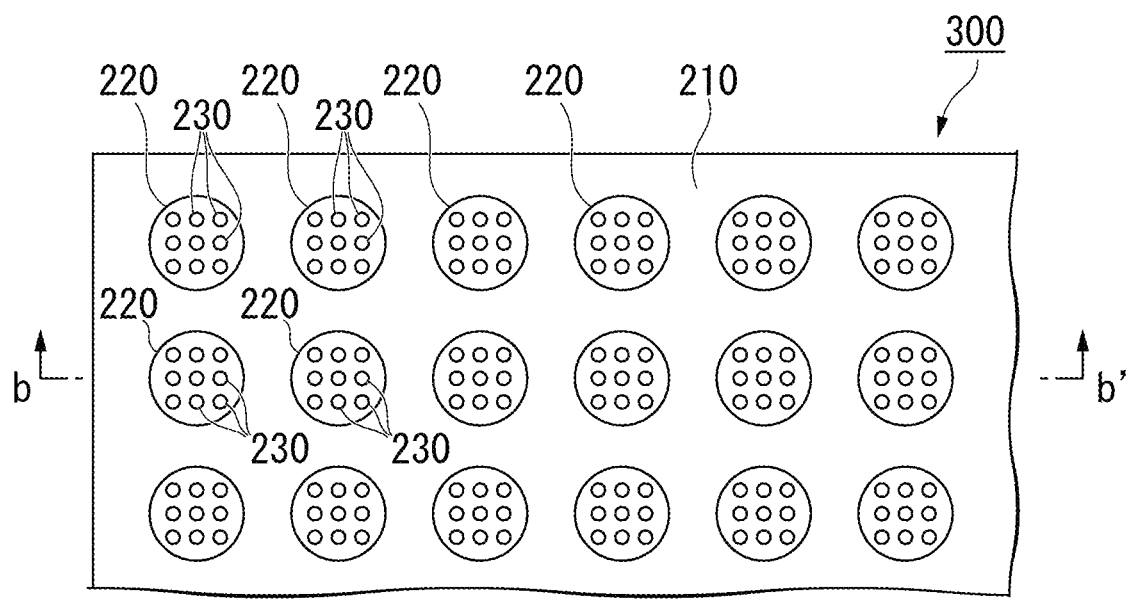
FIG. 3A is a schematic diagram showing an example of a well array having a first well and a second well.
Figure 3B:
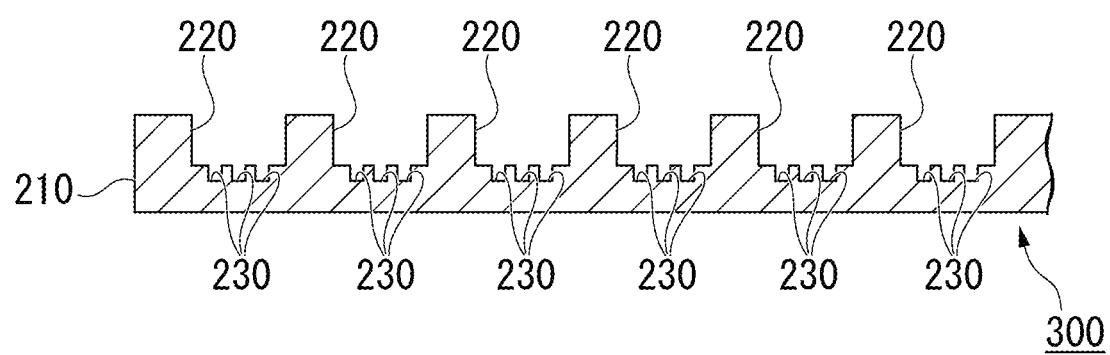
FIG. 3B is a cross-sectional view taken along line b-b' in an arrow direction of FIG. 3A.

FIGS. 3A and 3B are schematic diagrams showing another example of a well array having a first well and a second well. FIG. 3A is a top view, and FIG. 3B is a cross-sectional view taken along line b-b' in an arrow direction of FIG. 3A.

As shown in FIGS. 3A and 3B, a well array 300 is formed on one side of the substrate 210. Like the well array 300, a plurality of the second wells 230 may be arranged per the first well 220. Even in this case, in a case where the volume of the content of the first well 220 becomes small, the content is accumulated in the second well 230.

The shape of the first well 220 and the second well 230 is not particularly limited, and may be cylindrical, polyhedral formed by a plurality of faces (for example, rectangular parallelepiped, hexagonal, octagonal, and the like), and the like.

The plurality of the first wells 220 preferably have the same shape and same size, and the plurality of the second wells 230 preferably have the same shape and same size. Here, "same shape and same size" means having the same shape and the same volume to the extent of requiring performing digital measurement, and variations to the extent of manufacturing error are allowed.

Method for Manufacturing Well Array

Taking the well array 300 as an example, an example of a method for manufacturing a well array having a first well and a second well will be described.

Figure 4A:
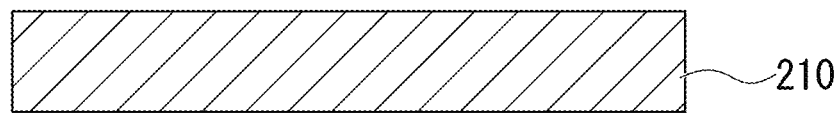
FIG. 4A is a schematic cross-sectional view showing a step of manufacturing a well array.

FIGS. 4A to 4F and FIGS. 5A and 5B are schematic cross-sectional views showing each step of manufacturing of the well array 300. First, as shown in FIG. 4A, a film 400 is laminated on a surface of the substrate 210.

Examples of the material for the substrate 210 include glass, resin, and the like. Examples of the resin include polyethylene, polypropylene, polystyrene, polycarbonate, cyclic polyolefin, and acryl, and the like. Examples of the material for the film 400 include fluorine resin, cyclic polyolefin, silicone resin, and the like.

Figure 4B:
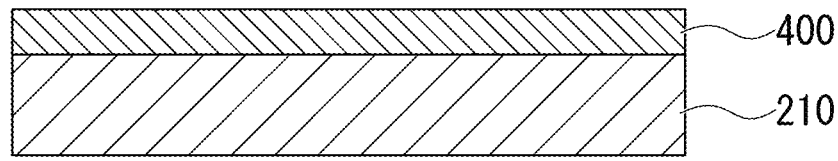
FIG. 4B is a schematic cross-sectional view showing a step of manufacturing a well array.
Figure 4C:
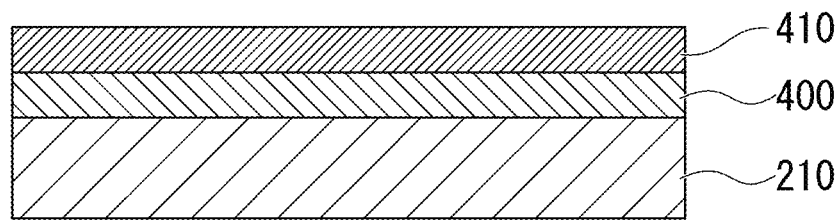
FIG. 4C is a schematic cross-sectional view showing a step of manufacturing a well array.
Figure 4D:
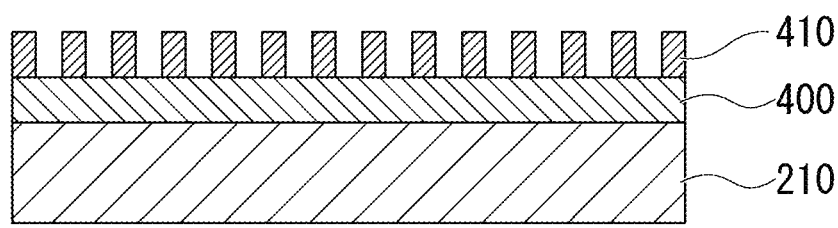
FIG. 4D is a schematic cross-sectional view showing a step of manufacturing a well array.

Subsequently, as shown in FIG. 4C, a resist film 410 is laminated on a surface of the film 400. Subsequently, using a well array-pattern mask, the resist film 410 is exposed by emission of active energy rays using an exposure machine. Subsequently, development is performed with a developing solution to remove the resist film 410 from a portion of forming the well, as shown in FIG. 4D.

Figure 4E:
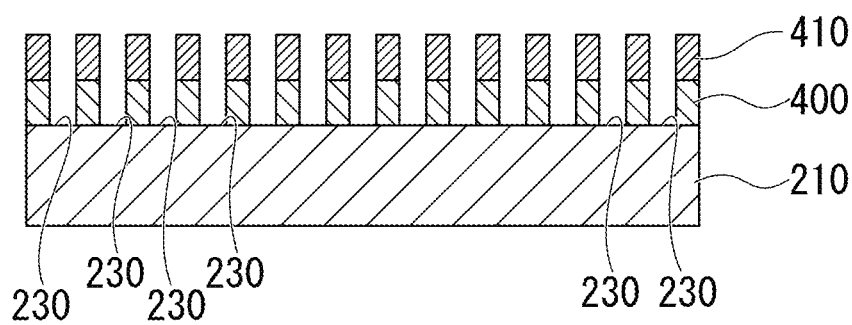
FIG. 4E is a schematic cross-sectional view showing a step of manufacturing a well array.

Subsequently, as shown in FIG. 4E, the film 400 masked with the resist film 410 is etched to form the second well 230 in the film 400.

Figure 4F:
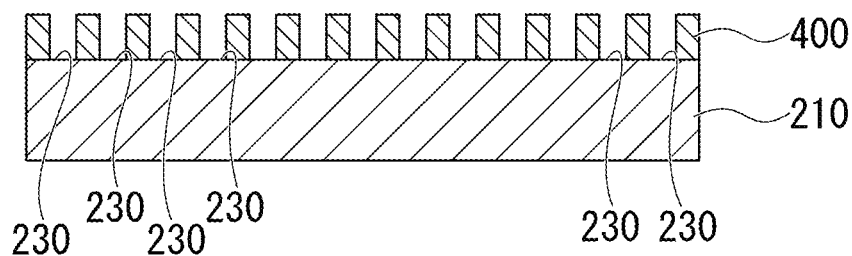
FIG. 4F is a schematic cross-sectional view showing a step of manufacturing a well array.

Subsequently, as shown in FIG. 4F, the substrate is washed to remove the resist film 410, and thereby an array of the wells 230 is obtained.

Figure 5A:
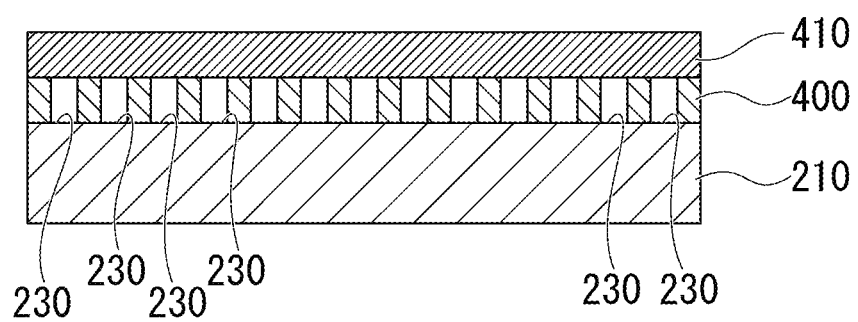
FIG. 5A is a schematic cross-sectional view showing a step of manufacturing a well array.

Subsequently, as shown in FIG. 5A, the resist film 410 is laminated again on the array of the wells 230 obtained in FIG. 4F. As the resist film 410, a sheet-type resist can be preferably used.

Figure 5B:
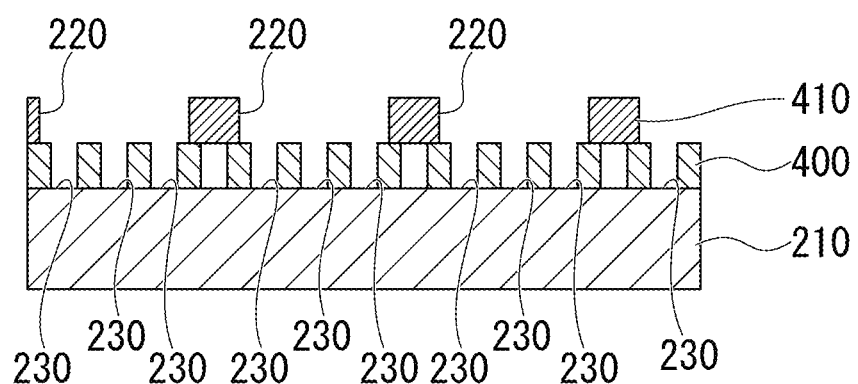
FIG. 5B is a schematic cross-sectional view showing a step of manufacturing a well array.

Subsequently, as shown in FIG. 5B, using a well array-pattern mask, the resist film 410 is exposed by emission of active energy rays using an exposure machine. Subsequently, development is performed with a developing solution to remove the resist film 410 from a portion of forming the first well 220. As a result, a well array 300 having a first well 220 and a second well 230 is obtained.

In the method for the present embodiment, it is preferable that 0 or 1 of the target substance is introduced per the first well. Digital measurement can be performed by introducing 0 or 1 of the target substance per the first well. That is, the number of wells in which fluorescent light is detected can be made to correspond to the number of molecules of the target substance molecules in the sample.

Sealing Liquid

The sealing liquid is preferably immiscible with water. "Immiscible with water" means that in a case where water and the sealing liquid are sufficiently mixed and then allowed to stand still, the mixture is separated into an aqueous phase and an organic phase. In addition, it is preferable that the sealing liquid has low water absorption. Low water absorption means that the volume change of an organic layer is 1% or less in a case of being mixed with an equal volume of water at 20° C. and allowed to stand still and being separated into an aqueous phase and an organic phase.

As the sealing liquid, a substance that has a boiling point of about 100° C. or higher and is liquid at room temperature can be used. Examples of a specific sealing liquid include fluorine-based liquid such as FC-40, FC-43, FC-770, FC-72, and FC-3283 (all manufactured by 3M), and Fomblin (registered trademark) Oil (Solvay Corporation), mineral oil (Sigma-Aldrich), linear or branched, saturated or unsaturated hydrocarbon having 7 to 17 carbon atoms, and the like. One type of these may be used alone, or two or more types may be mixed together and used.

Examples of the linear or branched, saturated or unsaturated hydrocarbon having 7 to 17 carbon atoms include heptane ($C_7H_{16}$), octane ($C_8H_{18}$), nonane ($C_9H_{20}$), decane ($C_{10}H_{22}$), undecane ($C_{11}H_{24}$), dodecane ($C_{12}H_{26}$), tridecane ($C_{13}H_{28}$), tetradecane ($C_{14}H_{30}$), pentadecane ($C_{15}H_{32}$), hexadecane ($C_{16}H_{34}$), heptadecane ($C_{17}H_{36}$), heptene ($C_7H_{14}$), octene ($C_8H_{16}$), nonene ($C_9H_{18}$), decene ($C_{10}H_{20}$), undecene ($C_{11}H_{22}$), dodecene ($C_{12}H_{24}$), tridecene ($C_{13}H_{26}$), tetradecene ($C_{14}H_{28}$), pentadecene ($C_{15}H_{30}$), hexadecene ($C_{16}H_{32}$), heptadecene ($C_{17}H_{34}$), and the like. These may be any isomers.

For example, examples of octane isomers include 1-octane, 2-methylheptane, 3-methylheptane, 2,2-dimethylhexane, 2,3-dimethylhexane, 2,3,3-trimethylpentane, and the like. In addition, for example, isomers of octene include 1-octene, 2-methyl-1-heptene, 2,3-dimethyl-1-hexene, 2-ethyl-1-hexene, 2,3,3-trimethyl-1-butene, and the like.

Water-Absorbing Organic Solvent

As the water-absorbing organic solvent, a water-absorbing organic solvent that has a boiling point of about 100° C. or higher, is a liquid at room temperature, and is immiscible with water can be used, and examples thereof include a linear or branched, saturated or unsaturated aliphatic alcohol having 4 to 11 carbon atoms. "Immiscible with water" means that in a case where water and an organic solvent are sufficiently mixed and then allowed to stand still, the mixture is separated into an aqueous phase and an organic phase. In addition, water absorption means dissolving water. The water-absorbing organic solvent may be a monohydric alcohol, or may be a dihydric or higher alcohol.

Examples of the specific water-absorbing organic solvent include butanol ($C_4H_{10}O$), pentanol ($C_5H_{12}O$), hexanol ($C_6H_{14}O$), heptanol ($C_7H_{16}O$), octanol ($C_8H_{18}O$), nonanol ($C_9H_{20}O$), decanol ($C_{10}H_{22}O$), undecanol ($C_{11}H_{24}O$), pentanediol ($C_5H_{12}O_2$), and the like. These may be any isomers. In addition, one type of these may be used alone, and two or more types may be mixed together and used.

For example, examples of isomers of octanol include 1-octanol, isooctyl alcohol, 2-ethylhexanol, and the like. In addition, for example, examples of the isomers of pentanediol include 1,5-pentanediol, 1,2-pentanediol, 2,3-pentanediol, and the like.

As will be described later in Examples, particularly in a case where 1-heptanol, 1-octanol, and 1-nonanol are used, an increase in fluorescence intensity due to dehydration concentration is acknowledged, and there is a tendency that the target substance can be detected with high sensitivity.

Fluid Device

In one embodiment, the present invention provides a fluid device, including:
a substrate having a surface on which a well array including a plurality of wells having a first well and a second well arranged at a bottom of the first well and having a smaller volume than the first well is arranged;
a lid member arranged to face the well array; and
a spacer for separating the substrate and the lid member, in which a space between the well array and the lid member forms a flow path through which fluid flows.

In the fluid device of the present embodiment, the substrate having a surface on which a well array is arranged is the same as described above.

Figure 6A:
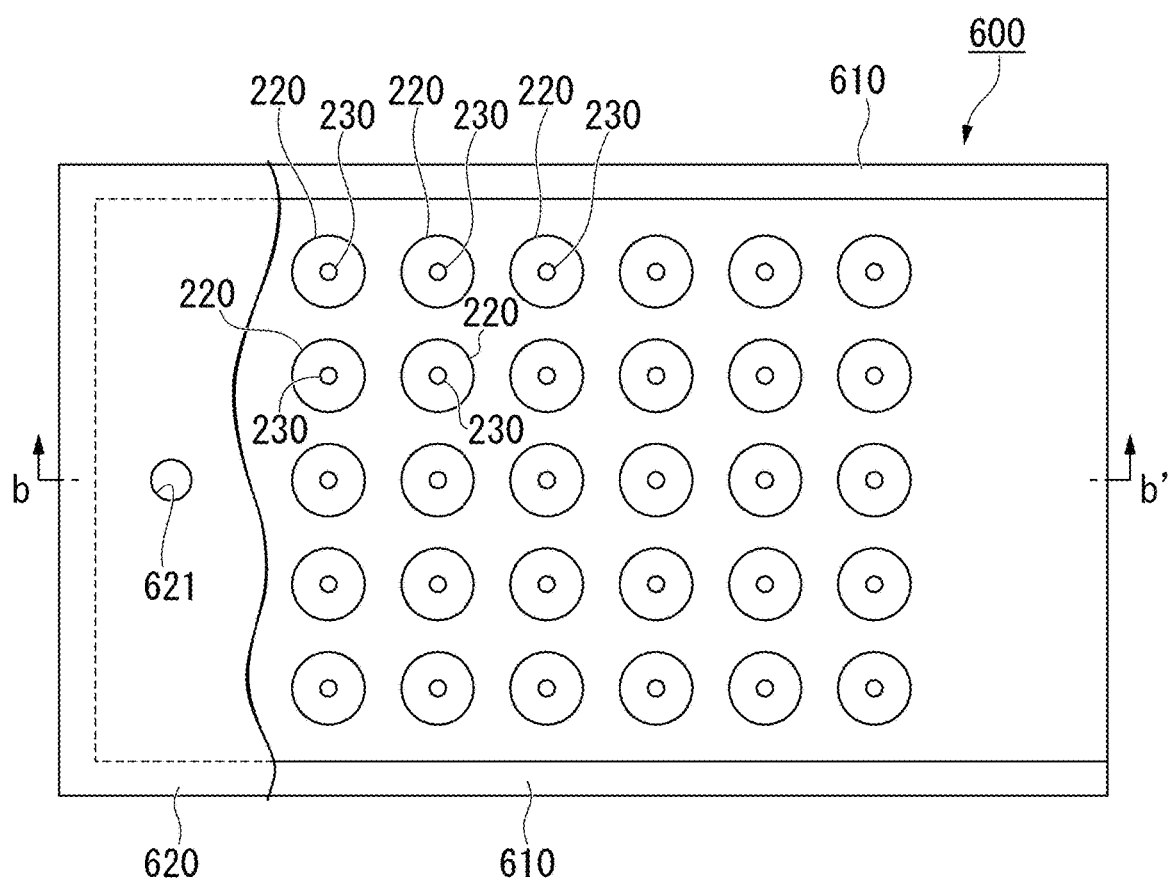
FIG. 6A is a top view showing an example of a fluid device.
Figure 6B:
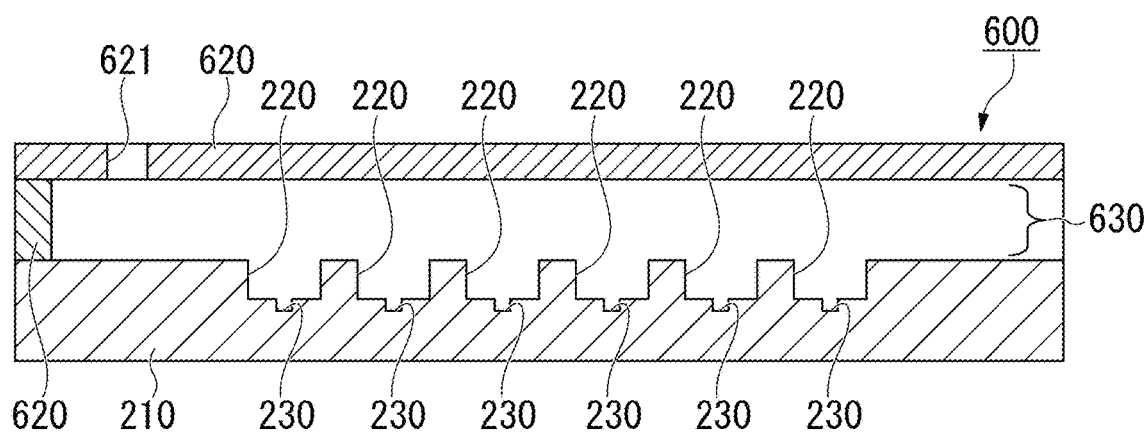
FIG. 6B is a cross-sectional view taken along line b-b' in an arrow direction of FIG. 6A.

FIG. 6A is a top view showing an example of the fluid device of the present embodiment. FIG. 6B is a cross-sectional view taken along line b-b' in an arrow direction of FIG. 6A.

As shown in FIGS. 6A and 6B, a fluid device 600 includes a substrate 210 having a surface on which a well array 200 including a plurality of wells having a first well 220 and a second well 230 arranged at a bottom of the first well 220 and having a smaller volume than the first well 220 is arranged, a spacer 610, and a lid member 620 having a liquid inlet 621 formed thereon. A space 630 between the substrate 210 and the lid member 620 functions as a flow path through which a sample, a detection reagent, a sealing liquid, a water-absorbing organic solvent, and the like flow.

The fluid device of the present embodiment can be suitably used for the above-described method for detecting a target substance.

Method for Detecting Target Substance

Here, the method for detecting a target substance according to the above-described embodiment will be more specifically described with reference to FIGS. 7A to 7D.

As described above, the method for detecting a target substance includes: a step of introducing a sample and a reagent that generates a fluorescent substance in a presence of the target substance into each well of a well array;
a step of sealing each well of the well array with a sealing liquid such that each well forms an independent reaction space;
a step of replacing the sealing liquid with a water-absorbing organic solvent, thereby dehydrating the content of the wells, reducing the volume, and generating the fluorescent substance in a case where the target substance is present in the content; and
a step of emitting excitation light to the fluorescent substance to detect fluorescent light generated in each well of the well array.

FIGS. 7A to 7D are schematic cross-sectional views showing an example of a procedure of carrying out the method for detecting a target substance. In FIGS. 7A to 7D, a single-stranded RNA fragment (tgRNA) is detected as a target substance. In addition, a Cas13a protein, a gRNA (crRNA), and a substrate nucleic acid fragment are used as reagents that generate a fluorescent substance in a case where the target substance is present.

First, as shown in FIG. 7A, an assay solution 710 in which a sample, a Cas13a protein, crRNA, and a substrate nucleic acid fragment are mixed is introduced through the liquid inlet 621 of the fluid device 600. As a result, as shown in FIG. 7A, the interior of the well 220, the interior of the well 230, and the space 630 between the substrate 210 and the lid member 620 are filled with the assay solution 710. That is, a sample, and a reagent that generates a fluorescent substance in a case where a target substance is present are introduced into each well of the well array.

Subsequently, each well of the well array is sealed with a sealing liquid. Specifically, a sealant 720 is introduced through the liquid inlet 621. In a case where the sealant 720 is introduced, an opening portion of the well 220 is sealed with the sealant 720 in a state in which the well 220 is filled with the assay solution 710. As a result, each well forms an independent reaction space.

Subsequently, as shown in FIG. 7B, the sealant 720 is replaced with a water-absorbing organic solvent 730. As a result, the content of the wells (assay solution 710) are dehydrated, the volume is reduced (concentrated), and a Cas13a-crRNA-tgRNA three-part complex in the assay solution 710 cleaves the substrate nucleic acid fragment (Reporter). As a result, a fluorescent substance F binding to the substrate nucleic acid fragment is separated from a quencher Q, and fluorescent light is emitted by emission of excitation light. Detection of fluorescent light in a well indicates a presence of a target substance in the well.

In a case where a target substance is not present in the assay solution 710, the Cas13a-crRNA-tgRNA three-part complex is not formed, and thus the substrate nucleic acid fragment is not cleaved and fluorescent light is not generated.

In addition, in a case where an amount of dehydration reaches a desired amount, the water-absorbing organic solvent 730 may be replaced with the sealant 720 again. With this, it is possible to stop the dehydration of the content of the wells (assay solution 710). That is, the method for detecting a target substance in a sample may further include a step of replacing the water-absorbing organic solvent with a sealing liquid.

By capturing the target substance in the large-volume well 220 in this way, the capture probability of the target substance is improved, and by performing the detection in the small-volume well 230, the target substance can be detected with high sensitivity and the time required for detection is also shortened.

Target Substance Detection Kit

In one embodiment, the present invention provides a target substance detection kit including the above-described fluid device, a reagent that generates a fluorescent substance in a presence of the target substance, a sealing liquid, and a water-absorbing organic solvent.

By using the kit of the present embodiment, the above-described method for detecting a target substance can be suitably carried out. In the kit of the present embodiment, the fluid device is the same as described above. In addition, the target substance, the reagent that generates a fluorescent substance in a case where the target substance is present, the sealing liquid, and the water-absorbing organic solvent are also the same as those described above.

EXAMPLES

Subsequently, the present invention will be described in more detail with reference to examples, but the present invention is not limited to the following examples.

Material and Method

Preparation of Cas13a Protein

An expression vector for Leptotrichia wadei Cas13a (LwCas13a) was transfected into Escherichia coli BL21 (DE3) strain for expression. The expression vector was a pET-based vector with a 10× His tag, a maltose binding protein (MBP), and a TEV protease cleavage site at the N-terminus. The expressed Cas13a protein was purified using Ni-NTA resin. Subsequently, after reacting TEV protease at 4° C. overnight, cation exchange chromatography was performed using MBPTrap HP column (GE Healthcare) and HiTrap Heparin HP column (GE Healthcare) connected thereto, and purification was further performed by gel filtration chromatography using a Superdex 200 column (GE Healthcare).

Preparation of Target Nucleic Acid Fragment

A target nucleic acid fragment (single-stranded RNA fragment, SEQ ID NO: 5) was chemically synthesized by outsourcing (IDT).

Preparation of gRNA

A DNA fragment encoding a gRNA (crRNA) was prepared by PCR amplification using an overlapping primer containing a T7 promoter sequence, a 20 base target sequence and a scaffold sequence as a template. Subsequently, the obtained DNA fragment was subjected to an in vitro transcription reaction to prepare crRNA. A base sequence of the gRNA (crRNA) for Cas13a protein is shown in SEQ ID NO: 4.

Preparation of Substrate Nucleic Acid Fragment

A substrate nucleic acid fragment (single-stranded RNA fragment) was chemically synthesized by outsourcing (IDT). A 5' end of the substrate nucleic acid fragment was labeled with a fluorescent substance, FAM, and a 3' end was labeled with a quencher, Iowa Black FQ (IDT). The base sequence of the chemically synthesized substrate nucleic acid fragment (single-stranded RNA fragment) was "5'-(FAM)UUUUU(IABkFQ)-3'" (here, "IABkFQ" stands for Iowa Black FQ).

Preparation of Well Array A

A well array A was prepared by the same procedure as in FIGS. 4A to 4F, described above. First, as shown in FIG. 4A, a glass substrate 210 was immersed in an 8M potassium hydroxide solution for about 24 hours to form a hydroxyl group on a surface.

Subsequently, as shown in FIG. 4B, the surface of the glass substrate 210 was spin-coated with a fluorine resin (CYTOP, manufactured by AGC Inc.) to form a film 400. The condition of the spin coating was 1,000 rpm (revolutions per minute) for 30 seconds. Under this condition, the film thickness of the film 400 is about 1.8 µm.

Subsequently, the film 400 was adhered to the surface of the glass substrate 210 by performing baking on a hot plate at 180° C. for 1 hour to cause dehydration condensation between a silanol group of the film 400 (CYTOP) and a hydroxyl group on the glass surface.

Subsequently, as shown in FIG. 4C, a resist (product name "AZ-P4903", manufactured by AZ Electronic Materials) was spin-coated on the surface of the film 400 at 4000 rps for 60 seconds to form a resist film 410.

Subsequently, the resist film 410 was adhered to the surface of the film 400 by baking the glass substrate 210 on a hot plate at 110° C. for 1 hour to evaporate an organic solvent in the resist film 410.

Subsequently, as shown in FIG. 4D, using a well array-pattern mask, the resist film 410 was exposed by emission of ultraviolet rays at 250 W for 14 seconds using an exposure machine (manufactured by Union Optical Co., Ltd.). Subsequently, the resist film 410 was developed by being immersed in a developing solution (AZ developer, manufactured by AZ Electronic Materials) for 1.5 minutes. As a result, a portion of the resist film 410 forming the well was removed.

Subsequently, as shown in FIG. 4E, the film 400 masked with the resist film 410 was dry-etched under conditions of 200 sccm of $O_2$, a pressure of 5 Pa, and an output of 50 W for 30 minutes using a Reactice ion etching device (manufactured by YAC) to form a well 230 on the film 400.

Subsequently, as shown in FIG. 4F, a glass substrate 210 was immersed in acetone, washed with isopropanol, and then washed with pure water to remove the resist film 410 and obtain an array of the well 230 (well array A). The well array A had a shape in which 1,500,000 cylindrical wells 230 with a diameter of 3.5 µm and a depth of 1.8 µm were arranged in an area of 1 $cm^2$. The volume per well of the well 230 was 17 fL.

Preparation of Well Array B

A well array B having a first well and a second well was prepared by the same procedures as those shown in FIGS. 4A to 4F, 5A, and 5B. First, the well array obtained in the same manner as in FIGS. 4A to 4F was dry-etched (13 sccm of $O_2$, a pressure of 14 Pa, an output of 125 W) for 5 seconds using a Reactice ion etching device (manufactured by Samco) to perform hydrophilic treatment on a well array surface. Subsequently, the well array was placed on a hot plate at 65° C., and a sheet-type resist (product name "SU-8 3020CF DFR Type-S", manufactured by KAYAKU Advanced Materials, Inc.) was adhered using a laminate roller to form a resist film 410, as shown in FIG. 5A.

Subsequently, as shown in FIG. 5B, using a well array pattern mask, the resist film 410 was exposed by emission of ultraviolet rays for 20 seconds using an exposure machine (manufactured by Union Optical Co., Ltd.). Subsequently, the resist film 410 was developed by being immersed in a developing solution (product name: "SU8 developer", manufactured by KAYAKU Advanced Materials, Inc.) for 8 minutes. As a result, a portion of the resist film 410 forming the wells was removed to obtain a well array B having the first well 220 and the second well 230.

The well array B had a shape in which a well array obtained by 40,000 cylindrical wells 220 with a diameter of 40 μm and a depth of 20 μm being arranged in 1 cm² was stacked on a well array obtained by 1,500,000 cylindrical wells 230 with a diameter of 3.5 um and a depth of 1.8 μm being arranged in 1 cm².

Figure 8:
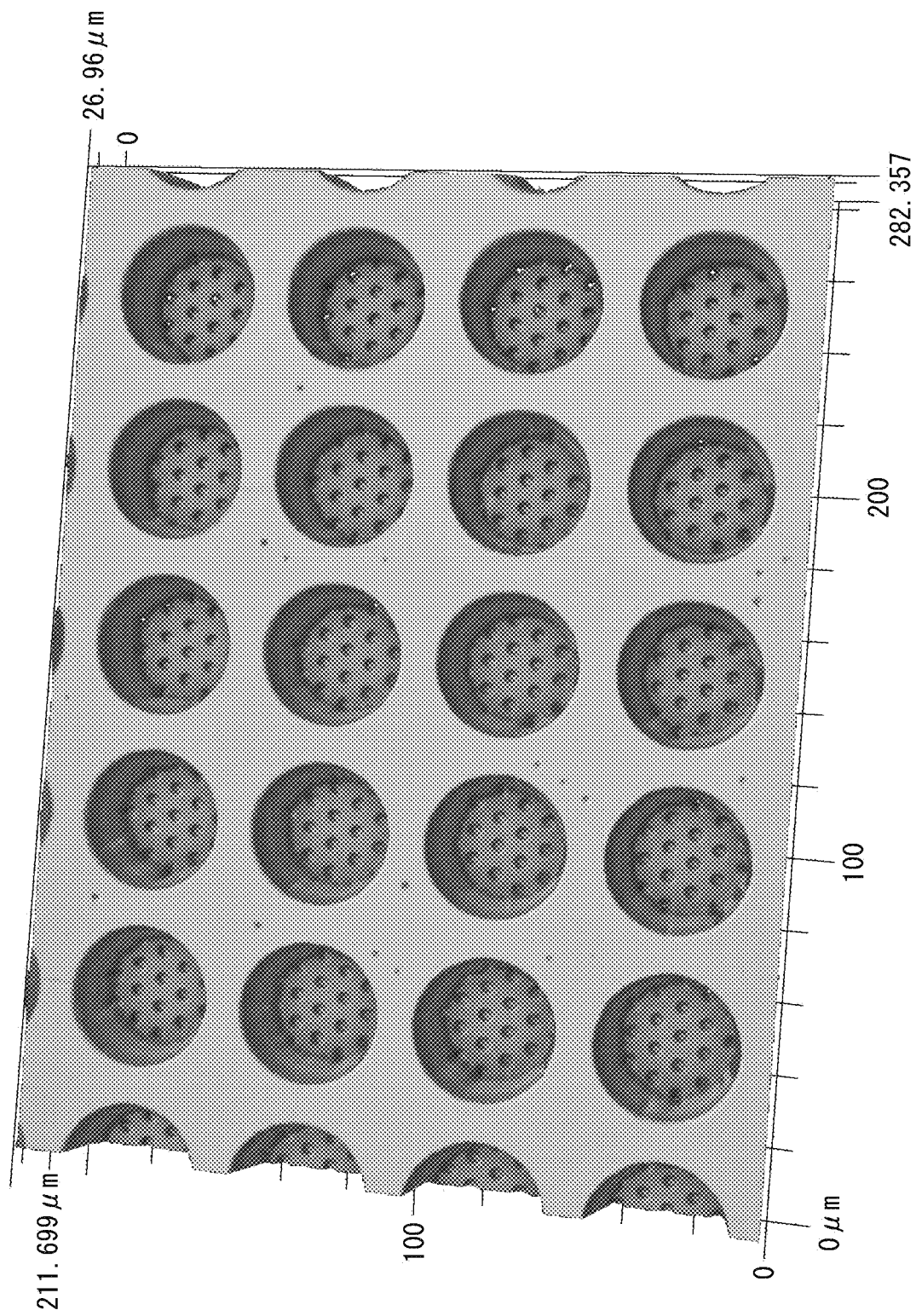
FIG. 8 is a photomicrograph of a well array.

The well array B had a shape in which 12 to 18 wells 230 were arranged at a bottom of each well 220. FIG. 8 is a photomicrograph of the prepared well array B.

Preparation of fluid device A

In the same manner as in FIG. 6, a spacer 220 was arranged in the above-described well array A, and a glass plate 620 having a liquid inlet 621 formed thereon was placed to prepare a fluid device A. As a result, a fluid device A was obtained in which a space between the well array A and the glass plate 620 was a flow path.

Preparation of fluid device B

In the same manner as in FIG. 6, a spacer 220 was arranged on the above-described well array B, and a glass plate 620 having a liquid inlet 621 formed thereon was placed to prepare a fluid device B. As a result, a fluid device B was obtained in which the space between the well array B and the glass plate 620 was a flow path.

Experimental Example 1

Examination using Cas13a

The Cas13a protein, the gRNA (SEQ ID NO: 4), and the target nucleic acid fragment were mixed in a buffer A having the composition shown in Table 1 below such that a final concentration of Cas13a protein is 40 nM, a final concentration of the gRNA is 25 nM, and a final concentration of the target nucleic acid fragment is 30 pM, 3 pM, 0.3 pM, or 0 pM, thereby forming a three-part complex. Hereinafter, the solution is referred to as a three-part complex solution.

TABLE 1

| Buffer A | |
|---|---|
| 20 mM HEPES (pH 7.5), 150 mM KCl | 19.89 mL |
| 2M MgCl₂ | 100 μL |
| 1M DTT | 10 μL |
| Total | 20 mL |

Four of the above-described fluid devices A were prepared. In addition, a solution was prepared by dissolving the substrate nucleic acid fragment in the buffer A to a final concentration of 10 μM.

Subsequently, each of the above-described three-part complex solution and an assay solution in which the substrate nucleic acid fragment solution was mixed was prepared, and immediately introduced through the liquid inlet of each fluid device A. As a result, the assay solution was introduced into each well of the well array.

Subsequently, a sealant (hexadecane, Sigma-Aldrich) was introduced through the liquid inlet of each fluid device A. As a result, the well into which the assay solution was introduced was sealed with a sealant, and each well became each independent reaction space. After several minutes, the well array of each fluid device A was observed under a fluorescence microscope.

Figure 9A:
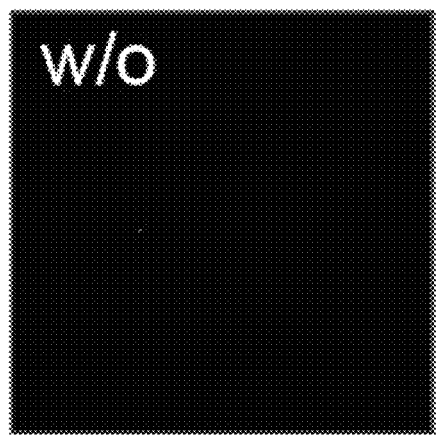
FIG. 9A is a photograph showing a result of Experimental Example 1.
Figure 9B:
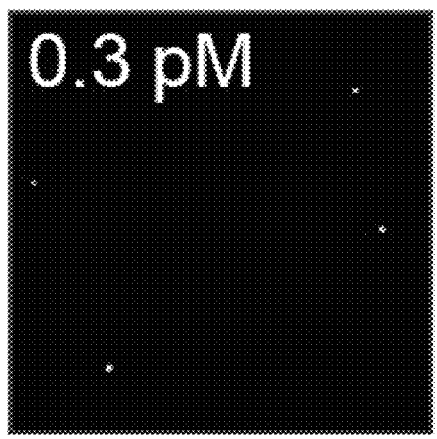
FIG. 9B is a photograph showing a result of Experimental Example 1.
Figure 9C:
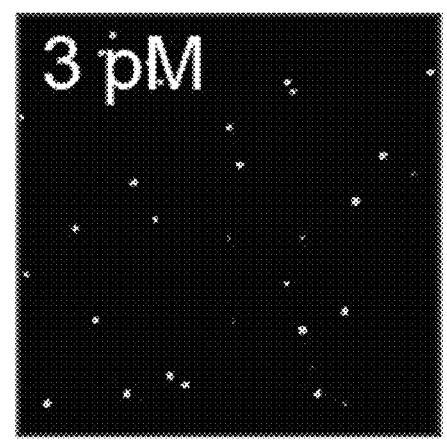
FIG. 9C is a photograph showing a result of Experimental Example 1.
Figure 9D:
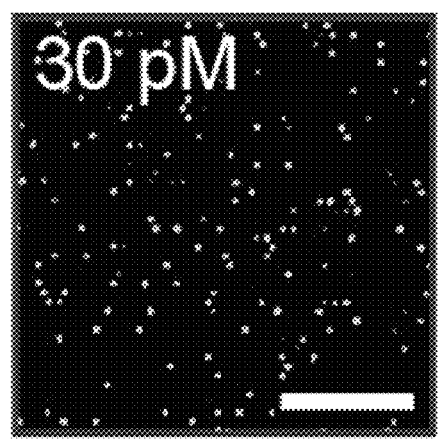
FIG. 9D is a photograph showing a result of Experimental Example 1.

FIG. 9A is a representative fluorescence micrograph showing results of an assay solution in which a final concentration of the target nucleic acid fragment is 0 pM. FIG. 9B is a representative fluorescence micrograph showing results of an assay solution in which a final concentration of the target nucleic acid fragment is 0.3 pM. FIG. 9C is a representative fluorescence micrograph showing results of an assay solution in which a final concentration of the target nucleic acid fragment is 3 pM. FIG. 9D is a representative fluorescence micrograph showing results of an assay solution in which a final concentration of the target nucleic acid fragment is 30 pM. Scale bar is 50 μm.

Figure 10A:
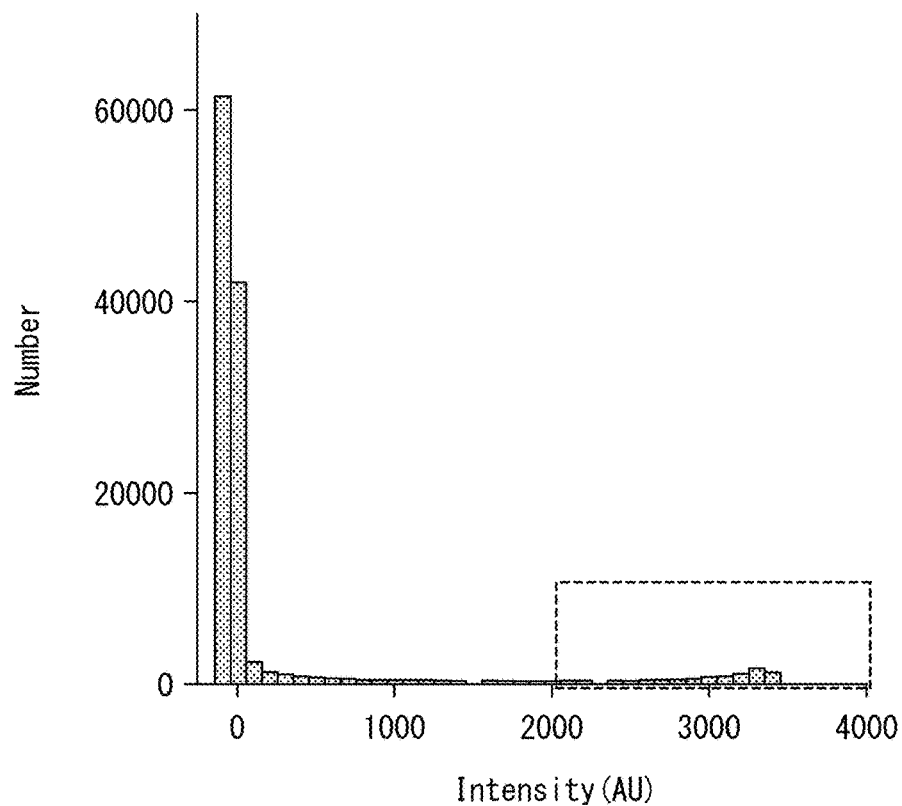
FIG. 10A is a graph showing the result of Experimental Example 1.
Figure 10B:
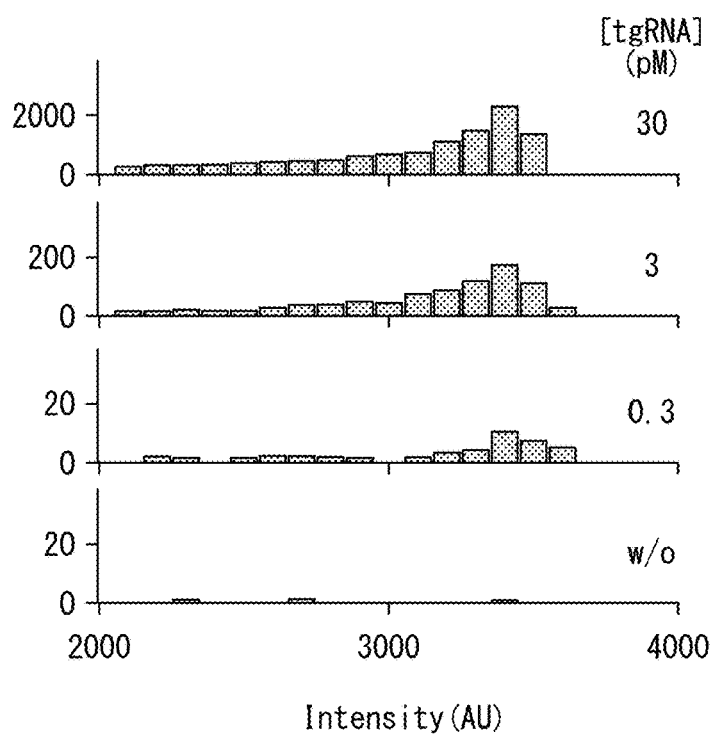
FIG. 10B is a graph showing the result of Experimental Example 1.

FIG. 10A is a representative graph showing the number of wells exhibiting predetermined fluorescence intensity (relative value) based on photographs of well arrays into which each assay solution was introduced. FIG. 10B is a graph similar to FIG. 10A for assay solutions in which the final concentration of the target nucleic acid fragment is 30 pM, 3 pM, 0.3 pM, or 0 pM, and is a graph which enlarged and arranged an area corresponding to an area enclosed by a dotted line in FIG. 10A.

As a result, it was clarified that a proportion of wells in which fluorescent light was detected increased in a concentration-dependent manner of the target nucleic acid fragment.

Figure 11:
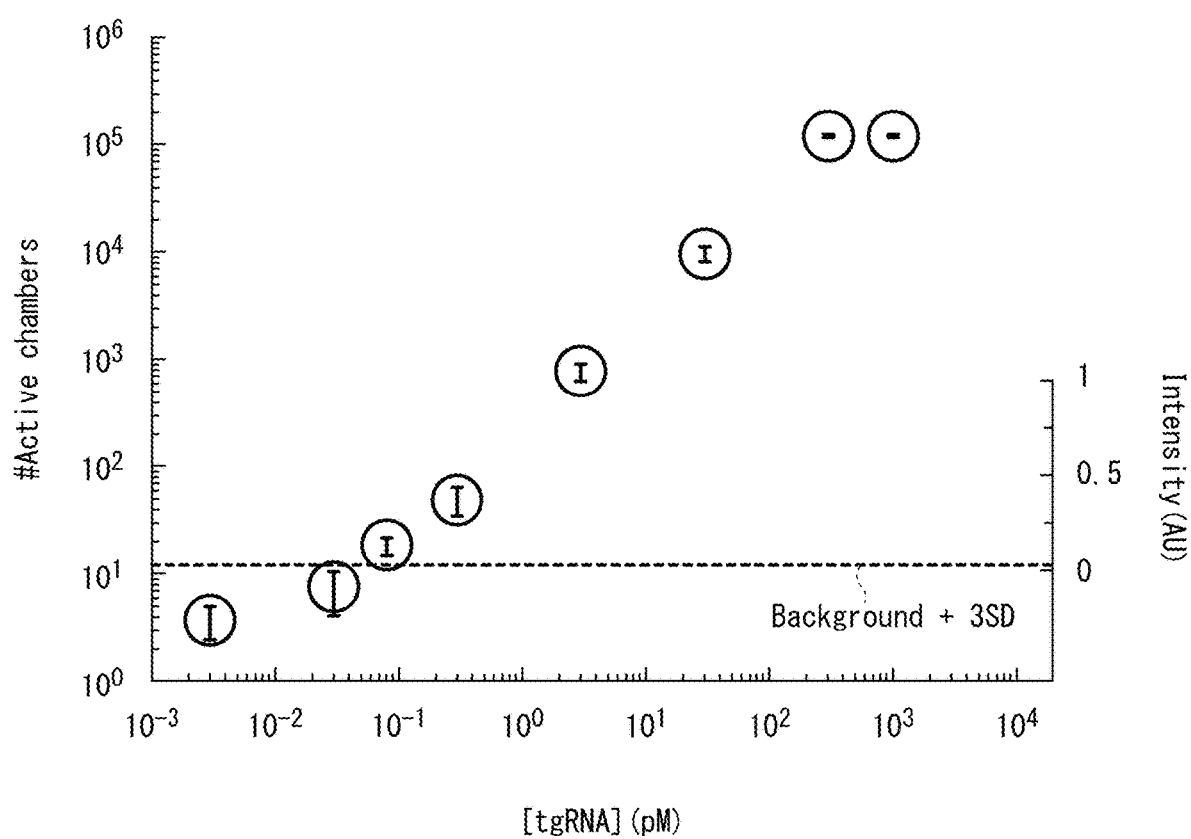
FIG. 11 is a graph showing the result of Experimental Example 1.

FIG. 11 is a graph showing a relationship between the number of wells in which fluorescent light was detected and the final concentration of the target nucleic acid fragment. The vertical axis indicates the number of wells in which fluorescent light was detected, and the horizontal axis indicates the final concentration of the target nucleic acid fragment. As a result, it was clarified that the detection sensitivity in a case of using the fluid device was about 56 fM.

Experimental Example 2

Concentration Examination 1

150 fM of alkaline phosphatase (Sigma-Aldrich) and an assay solution mixed with 1 μM of a fluorescent substrate (sTG-phos) were prepared, and introduced through a fluid inlet of the above-described fluid device B. Chemical formula of sTG-phos is shown in Formula (1) below (refer to Sakamoto S., et al., Multiplexed single-molecule enzyme activity analysis for counting disease-related proteins in biological samples, Sci Adv. 6 (11), eaay0888, 2020.). As a result, the assay solution was introduced into each well of the well array.

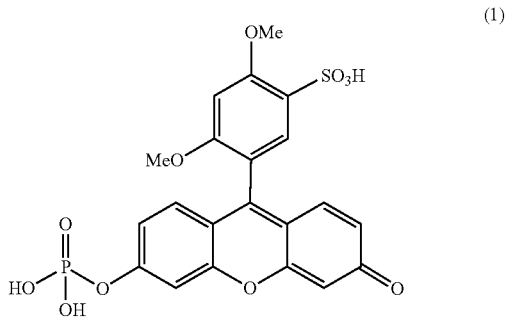 [SMILES: COc1cc(OC)c(S(=O)(=O)O)cc1-c1c2ccc(=O)cc-2oc2cc(OP(=O)(O)O)ccc12]

(1)

Subsequently, a sealant (hexadecane, Sigma-Aldrich) was introduced through the liquid inlet of the fluid device B. As a result, the well into which the assay solution was introduced was sealed with a sealant, and each well became each independent reaction space.

Subsequently, a water-absorbing organic solvent was introduced through the liquid inlet of the fluid device B to replace the sealant. As the water-absorbing organic solvent, each of 1-pentanol, 1-hexanol, 1-heptanol, 1-octanol, and 1-nonanol was examined. As a result, the content of the wells was dehydrated, the volume was reduced, and alkaline phosphatase and sTG-phos in the content were reacted with each other to generate a fluorescent substance (sTG). The chemical formula of sTG is shown in Formula (2).

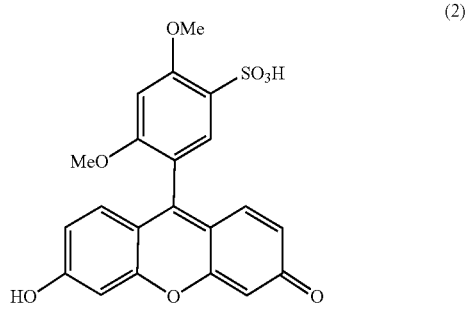 [SMILES: COc1cc(OC)c(S(=O)(=O)O)cc1-c1c2ccc(=O)cc-2oc2cc(O)ccc12]

(2)

Figure 12:
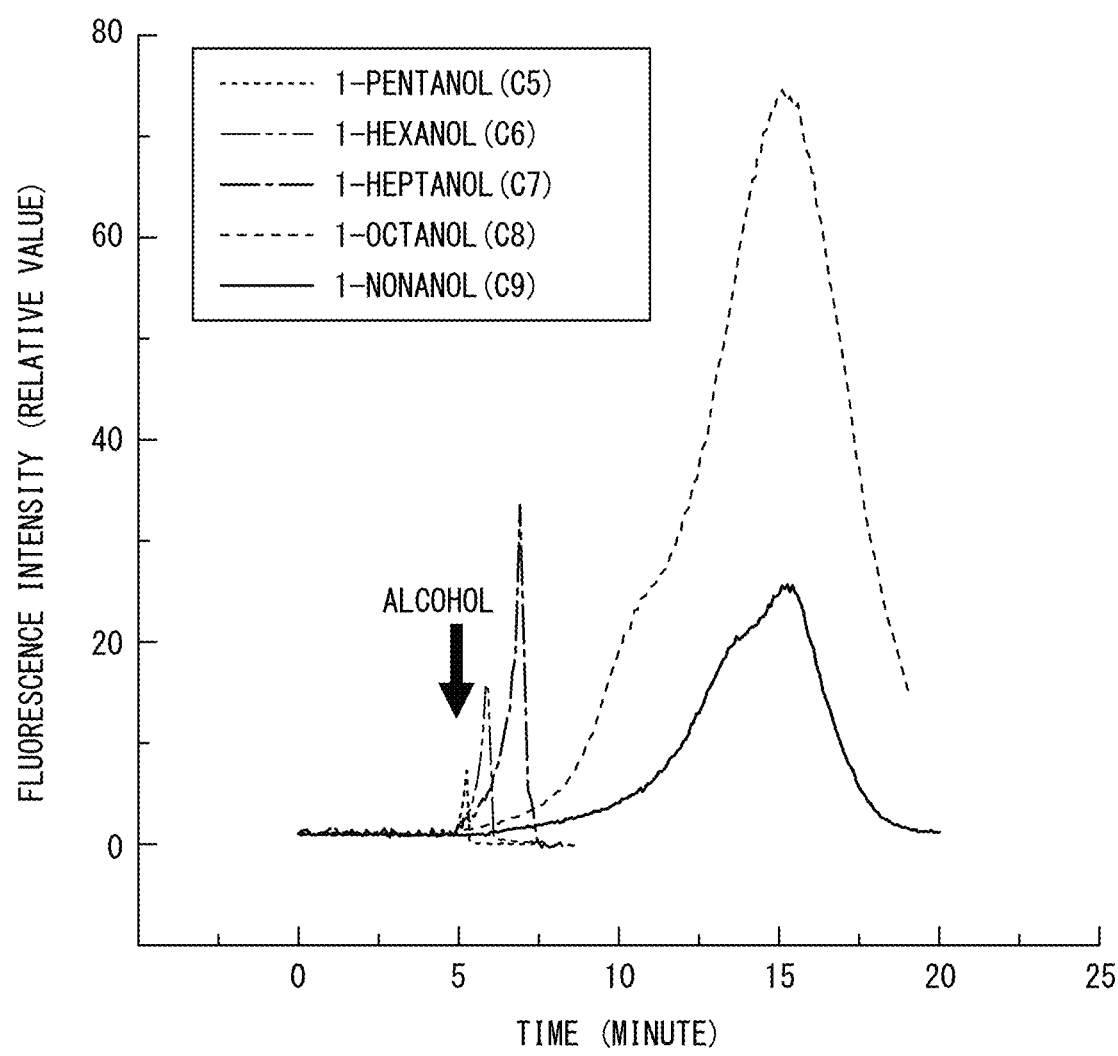
FIG. 12 is a graph showing a result of Experimental Example 2.

Subsequently, sTG fluorescence was detected over time. FIG. 12 is a graph showing results of measuring changes over time in fluorescence intensity (relative value) of sTG in a case of using each water-absorbing organic solvent. As a result, in particular, in a case where 1-heptanol, 1-octanol, and 1-nonanol were used, an increase in fluorescence intensity due to dehydration concentration was acknowledged.

Experimental Example 3

Concentration Examination 2

An assay solution was prepared by mixing serially diluted alkaline phosphatase (Sigma-Aldrich) with 1 µM of fluorescent substrate (sTG-phos), and introduced through the fluid inlet of the above-described fluid device B. As a result, the assay solution was introduced into each well of the well array.

Subsequently, a sealant (hexadecane, Sigma-Aldrich) was introduced through the liquid inlet of the fluid device B. As a result, the well into which the assay solution was introduced was sealed with a sealant, and each well became each independent reaction space.

Subsequently, 1-octanol was introduced through the liquid inlet of the fluid device to replace the sealant. As a result, the content of the wells was dehydrated, the volume was reduced, and alkaline phosphatase and sTG-phos in the content were reacted with each other to generate a fluorescent substance (sTG).

Figure 13:
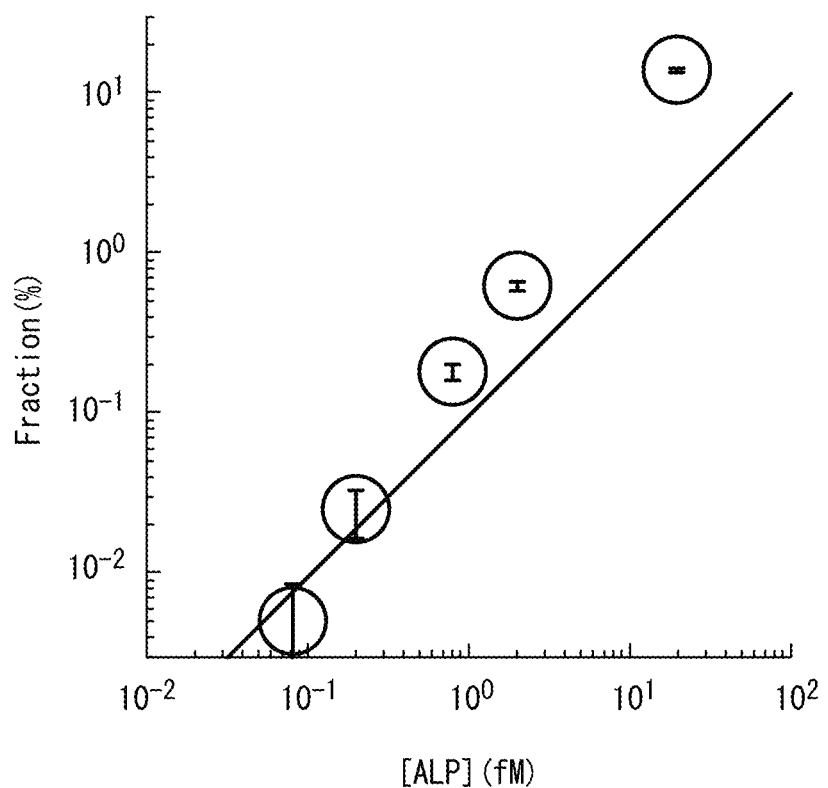
FIG. 13 is a graph showing a result of Experimental Example 3.

Subsequently, 2.5 minutes after the introduction of 1-octanol, 1-octanol was replaced with a sealant (product name "Fomblin (registered trademark) Oil", Solvay Corporation). As a result, the dehydration of the content of the wells was stopped. Subsequently, sTG fluorescence was detected. FIG. 13 is a representative graph showing the proportion (%) of wells exhibiting predetermined fluorescence intensity (relative value) based on a photograph of the well array in which sTG fluorescence was detected. In FIG. 13, the horizontal axis of the graph indicates the concentration of alkaline phosphatase (ALP).

As a result, it was clarified that a presence of about 80 aM of alkaline phosphatase could be detected. That is, it was clarified that the detection sensitivity in a case of performing dehydration concentration using 1-octanol, using the fluid device B, was about 80 aM.

INDUSTRIAL APPLICABILITY

According to the present invention, it is possible to provide a technology capable of detecting a target substance with high sensitivity.

REFERENCE SIGNS LIST 100, 100: Three-part complex
110: Cas12a protein
120: gRNA
130: Two-part complex
140: Target substance (target nucleic acid fragment)
150: Substrate nucleic acid fragment
200, 300: Well array
210: Substrate
220: First well
230: Second well
400, 410: Film
600: Fluid device
610: Spacer
621: Liquid inlet
620: Lid member
630: Space
710: Assay solution
720: Sealant
730: Water-absorbing organic solvent
F: Fluorescent substance
Q: Quencher

The invention claimed is:

1. A method for detecting a target substance in a sample, comprising:
   introducing the sample and a reagent that generates a fluorescent substance in a presence of the target substance into each well of a well array;
   sealing each well of the well array with a sealing liquid such that each well forms an independent reaction space;
   replacing the sealing liquid with a water-absorbing organic solvent, thereby dehydrating a content of the well, reducing a volume, and generating the fluorescent substance in a case where the target substance is present in the content; and
   emitting excitation light to the fluorescent substance to detect fluorescent light generated in each well of the well array,
   wherein detection of the fluorescent light in the well indicates the presence of the target substance in the well.

2. The method according to claim 1,
   wherein each well of the well array has a first well and a second well arranged at a bottom of the first well and having a smaller volume than the first well, and in a case where a volume of a content of the first well becomes small, the content is accumulated in the second well.

3. The method according to claim 2,
   wherein a ratio of the volumes of the first well and the second well (volume of first well: volume of second well) is 10:1 to 1,000,000:1.

4. The method according to claim 2, wherein the volume of the first well is 1 to 1,000 pL and the volume of the second well is 0.1 to 1,000 fL.

5. The method according to claim 2,
   wherein 0 or 1 of the target substance is introduced into each of the first wells.

6. The method according to claim 1,
   wherein the sealing liquid is a fluorine-based liquid, a mineral oil, or a linear or branched, saturated or unsaturated hydrocarbon having 7 to 17 carbon atoms.

7. The method according to claim 1,
wherein the water-absorbing organic solvent is a linear or branched, saturated or unsaturated aliphatic alcohol having 4 to 11 carbon atoms.

8. A fluid device comprising:
a substrate having a surface on which a well array including a plurality of wells having a first well and a second well-arranged at a bottom of the first well and having a smaller volume than the first well is arranged;
a lid member arranged to face the well array; and a spacer for separating the substrate and the lid member, wherein a space between the well array and the lid member forms a flow path through which fluid flows; and
wherein the fluid device is configured to perform the method of claim 1.

9. A target substance detection kit comprising:
the fluid device according to claim 8;
a reagent that generates a fluorescent substance in a presence of the target substance;
a sealing liquid; and
a water-absorbing organic solvent.

\* \* \* \* \*

SEQUENCE LISTING

<160> NUMBER OF SEQ ID NOS: 5

<210> SEQ ID NO 1
<211> LENGTH: 20
<212> TYPE: DNA
<213> ORGANISM: Artificial Sequence
<220> FEATURE:
<223> OTHER INFORMATION: Synthesyzed oligonucleotide

<400> SEQUENCE: 1
gccaagcgca cctaatttcc                                                   20

```
<210> SEQ ID NO 2
<211> LENGTH: 40
<212> TYPE: RNA
<213> ORGANISM: Artificial Sequence
<220> FEATURE:
<223> OTHER INFORMATION: Synthesyzed oligonucleotide

<400> SEQUENCE: 2
aauuucuacu aaguguagau ggaaauuagg ugcgcuuggc                        40

<210> SEQ ID NO 3
<211> LENGTH: 28
<212> TYPE: RNA
<213> ORGANISM: Artificial Sequence
<220> FEATURE:
<223> OTHER INFORMATION: Synthesyzed oligonucleotide

<400> SEQUENCE: 3
auggauuacu ugguagaaca gcaaucua                                     28

<210> SEQ ID NO 4
<211> LENGTH: 64
<212> TYPE: RNA
<213> ORGANISM: Artificial Sequence
<220> FEATURE:
<223> OTHER INFORMATION: Synthesyzed oligonucleotide

<400> SEQUENCE: 4
gauuuagacu accccaaaaa cgaaggggac uaaaacuaga uugcuguucu accaaguaau   60
ccau                                                               64

<210> SEQ ID NO 5
<211> LENGTH: 120
<212> TYPE: RNA
<213> ORGANISM: Artificial Sequence
<220> FEATURE:
<223> OTHER INFORMATION: Synthesyzed oligonucleotide

<400> SEQUENCE: 5
gggggccagu gaauucgagc ucgguacccg gggauccucu agaaauaugg auuacuuggu   60
agaacagcaa ucuacucgac cugcaggcau gcaagcuugg cguaaucaug gucauagcug  120
```